US006737762B2

(12) United States Patent
Koenig

(10) Patent No.: US 6,737,762 B2
(45) Date of Patent: May 18, 2004

(54) GENERATOR WITH DC BOOST FOR UNINTERRUPTIBLE POWER SUPPLY SYSTEM OR FOR ENHANCED LOAD PICKUP

(75) Inventor: David J. Koenig, Wyoming, MN (US)

(73) Assignee: Onan Corporation, Minneapolis, MN (US)

(*) Notice: Subject to any disclaimer, the term of this patent is extended or adjusted under 35 U.S.C. 154(b) by 5 days.

(21) Appl. No.: 09/999,788

(22) Filed: Oct. 26, 2001

(65) Prior Publication Data

US 2003/0080622 A1 May 1, 2003

(51) Int. Cl.[7] .................................................. H02J 3/32
(52) U.S. Cl. ............................... 307/48; 307/64; 307/86
(58) Field of Search ............................. 307/48, 86, 64, 307/66

(56) References Cited

U.S. PATENT DOCUMENTS

| | | | |
|---|---|---|---|
| 4,401,895 A | 8/1983 | Petkovsek | 307/66 |
| 4,405,867 A | 9/1983 | Moakler et al. | 307/64 |
| 4,465,943 A | 8/1984 | Risberg | 307/67 |

(List continued on next page.)

OTHER PUBLICATIONS

"Cross Coupled Gates Synchronous Rectifier", *IBM Technical Disclosure Bulletin*, http://www.delphion.com/tdbs/tdb?order=92A+62539, (Sep. 1992), 462–463.
"Dc–Dc Converter", *IBM Technical Disclosure Bulletin*, http://www.delphion.com/tdbs/tdb?order=83A+61951, (Aug. 1983), 1560–1561.
Caricchi, F.., et al. , Experimental Study of a Bidirectional DC–DC Converter for the DC Link Voltage Control and the Regenerative Braking in PM Motor.
Drives Devoted to Electrical Vehicles, *IEEE*, (1994),381–386.
Tolbert, Leon.M. ,et al. , "A Bi–Directional DC–DC Converter with Minimum Energy Storage Elements", *IEEE*, (2002),6 pages.
"Cat UPS Awarded Top 100 R&D Honor", *Caterpillar Inc.*, http://www.cat.com/industry_solutions/shared/electric_power/whats . . . /electricpower&origdoc, 2 pages, (2000).
O'Brien D., "Introduction to Electrochemical Capacitors", *Mallory—North American Capacitor Company*, http://www.nacc–mallory.com/catalog/electrochemical/intromec.htm, 6 pages, (2001).

*Primary Examiner*—Gregory J. Toatley, Jr.
*Assistant Examiner*—Sharon A. Polk
(74) *Attorney, Agent, or Firm*—Schwegman, Lundberg, Woessner & Kluth, P.A.

(57) ABSTRACT

A local power generation system generates a substantially DC voltage at an inverter input, which is modulated to generate a resulting output AC power signal to a load. The inverter input voltage may be obtained from an engine generator, providing an AC power signal that is rectified, or from a fuel cell generator providing a DC voltage that is converted to the desired voltage value at the inverter input. An energy storage device helps maintain the DC voltage when load power draw increases, until the engine (or fuel cell reaction) accelerates enough to accommodate the increased power demand. The system may also be used in an uninterruptible power supply (UPS) application, in which the load draws power from a utility-provided AC power source until a fault condition appears. When the fault condition appears, the load switches its power draw from the utility-provided AC power source to the inverter output. The energy storage device helps maintain the DC voltage at the inverter input until the generator (engine or fuel cell) starts and accelerates to a level sufficient provide the DC voltage. The system may also include switching devices for providing uninterruptible power to a critical load, while permitting a noncritical load to be subjected to a fault-condition on the utility-provided AC power signal for a short period of time, before switching to receive power from the inverter output.

52 Claims, 6 Drawing Sheets

U.S. PATENT DOCUMENTS

| | | | |
|---|---|---|---|
| 4,703,191 A | * 10/1987 | Ferguson | 307/64 |
| 4,827,152 A | 5/1989 | Farkas | 307/68 |
| 5,053,635 A | * 10/1991 | West | 307/67 |
| 5,198,970 A | * 3/1993 | Kawabata et al. | 363/37 |
| 5,332,927 A | 7/1994 | Paul et al. | 307/66 |
| 5,579,197 A | * 11/1996 | Mengelt et al. | 361/93.4 |
| 5,619,076 A | 4/1997 | Layden et al. | 307/48 |
| 5,635,773 A | * 6/1997 | Stuart | 307/66 |
| 5,646,458 A | 7/1997 | Bowyer et al. | 307/67 |
| 5,670,833 A | * 9/1997 | Mengelt et al. | 307/66 |
| 5,767,591 A | 6/1998 | Pinkerton | 307/64 |
| 5,811,960 A | 9/1998 | Van Sickle et al. | 322/4 |
| 5,880,537 A | 3/1999 | Windhorn | 307/64 |
| 5,994,794 A | 11/1999 | Wehrlen | 307/66 |
| 6,122,181 A | 9/2000 | Oughton, Jr. | 363/37 |
| 6,134,124 A | * 10/2000 | Jungreis et al. | 363/34 |
| 6,172,432 B1 | * 1/2001 | Schnackenberg et al. | 307/23 |
| 6,184,593 B1 | * 2/2001 | Jungreis | 307/64 |
| 6,194,880 B1 | 2/2001 | Fraidlin et al. | 323/222 |
| 6,198,176 B1 | 3/2001 | Gillette | 307/64 |
| 6,243,277 B1 | 6/2001 | Sun et al. | 363/65 |
| 6,266,260 B1 | 7/2001 | Zahrte, Sr. et al. | 363/132 |
| 6,281,595 B1 | 8/2001 | Sinha et al. | 290/40 |
| 6,288,456 B1 | * 9/2001 | Cratty | 307/64 |
| 6,304,006 B1 | * 10/2001 | Jungreis | 307/64 |
| 6,344,985 B1 | 2/2002 | Akerson | 363/65 |
| 6,367,259 B1 | * 4/2002 | Timm | 60/641.8 |
| 6,369,461 B1 | 4/2002 | Jungreis et al. | 307/46 |
| 6,385,056 B1 | 5/2002 | Gucyski | 363/15 |
| 6,487,096 B1 | 11/2002 | Gilbreth et al. | 363/35 |
| 2002/0047309 A1 | 4/2002 | Droppo et al. | 307/43 |
| 2002/0126517 A1 | 9/2002 | Matsukawa et al. | 363/69 |

* cited by examiner

GENERATOR WITH DC BOOST FOR UNINTERRUPTIBLE POWER SUPPLY SYSTEM OR FOR ENHANCED LOAD PICKUP

TECHNICAL FIELD

This document relates generally to providing electrical power from a fuel-powered generator and particularly, but not by way of limitation, to a generator with DC boost for an uninterruptible power supply system or for enhanced load pickup.

BACKGROUND

Both businesses and households rely on electrical equipment powered from one-phase, two-phase, three-phase, or other suitable utility-provided alternating-current (AC) power sources. However, commercial power reliability may not suffice for certain applications, for example, for computer facilities, hospitals, banking systems, or industrial motor loads. Therefore, a backup—or even an independent—local power source may be desirable to provide a supplement to or substitute for a utility-provided AC power source.

One type of a local power source is a static system, which typically uses an inverter to generate the load's AC power from a direct current (DC) battery bank. Providing power from such a static system for an extended period of time, however, may require a large and costly bank of batteries. Another type of local power source is a rotary system, which typically uses a gasoline or diesel engine to rotate the shaft of an AC generator to produce an AC load current for an extended period of time. In such a system, a providing a stable output voltage signal typically requires a constant rotational shaft velocity. However, load-switching, motor-starting, or other load variations may perturb shaft velocity and, in turn, may perturb the stability of the output voltage signal. A mechanical flywheel storing kinetic energy may assist in maintaining a constant shaft velocity may be maintained by storing kinetic energy, such as in a mechanical flywheel. However, this, provides a bulky, costly, and inefficient solution. For these and other reasons, the present inventor has recognized a need for an improved backup and/or substitute local AC power source.

SUMMARY

A local power generation system generates a substantially DC voltage at an inverter input, which is modulated to generate a resulting output AC power signal to a load. The inverter input voltage may be obtained from an engine generator, providing an AC power signal that is rectified, or from a fuel cell generator providing a DC voltage that is converted to the desired voltage value at the inverter input. An energy storage device helps maintain the DC voltage when load power draw increases, until the engine (or fuel cell reaction) accelerates enough to accommodate the increased power demand. The system may also be used in an uninterruptible power supply (UPS) application, in which the load draws power from a utility-provided AC power source until a fault condition appears. When the fault condition appears, the load switches its power draw from the utility-provided AC power source to the inverter output. The energy storage device helps maintain the DC voltage at the inverter input until the generator (engine or fuel cell) starts and accelerates to a level sufficient provide the DC voltage. The system may also include switching devices for providing uninterruptible power to a critical load, while permitting a noncritical load to be subjected to a fault-condition on the utility-provided AC power signal for a short period of time, before switching to receive power from the inverter output.

In one example, this document discusses a system providing AC electrical power to a first load includes a generator. An inverter includes an inverter input coupled to the generator output and an inverter output adapted to be coupled to the first load device. The system also includes an energy storage device and a first DC-to-DC converter circuit. An input of the first converter is coupled to the energy storage device. An output of the first converter is coupled to the inverter input. An energy supply circuit provides an energy supply circuit output coupled to the energy storage device. The energy supply circuit input is coupled to a power source selected from at least one of a utility-provided AC power source outside of the system and the generator output.

In another example, this document discusses a method of providing an electrical AC output signal to a first load. In this method, a first approximately DC voltage is generated from a fuel. The first DC voltage is modulated into the AC output signal. The AC output signal is provided to the first load. A limited amount of energy is transferred from an energy storage device onto the first DC voltage. The energy amount is substantially limited to that needed to maintain the first DC voltage at a first predetermined DC voltage value while the first load draws surge power AC output signal.

In another example, this document discusses a method of providing AC electrical power to a first load. In this method, a first load is decoupled from a utility-provided AC power source upon detecting a fault condition at the utility-provided AC power source. A DC voltage is modulated to provide backup AC power. The backup AC power is coupled to the first load when the first load is decoupled from the utility-provided AC power source. The generator is turned on to provide energy to the DC voltage. Energy is transferred from an energy storage device to the DC voltage during a time from the turning on of the generator to a time at which the generator is supplying sufficient power to maintain the DC voltage at a first predetermined voltage value. Other aspects of the invention will be apparent on reading the following detailed description and viewing the drawings that form a part thereof.

BRIEF DESCRIPTION OF THE DRAWINGS

In the drawings, which are offered by way of example, and not by way of limitation, and which are not necessarily drawn to scale, like numerals describe substantially similar components throughout the several views. Like numerals having different letter suffixes represent different instances of substantially similar components.

DETAILED DESCRIPTION

The following detailed description refers to the accompanying drawings which form a part hereof. These drawings show, by way of illustration, specific embodiments of practicing the invention. This document describes these embodiments in sufficient detail to enable those skilled in the art to practice the invention. One should understand that the embodiments may be combined, other embodiments may be utilized, or structural, logical and/or electrical changes may be made without departing from the scope of the present invention. The following detailed description is, therefore, not to be taken in a limiting sense, and the scope of the present invention is defined by the appended claims and their equivalents.

Figure 1:
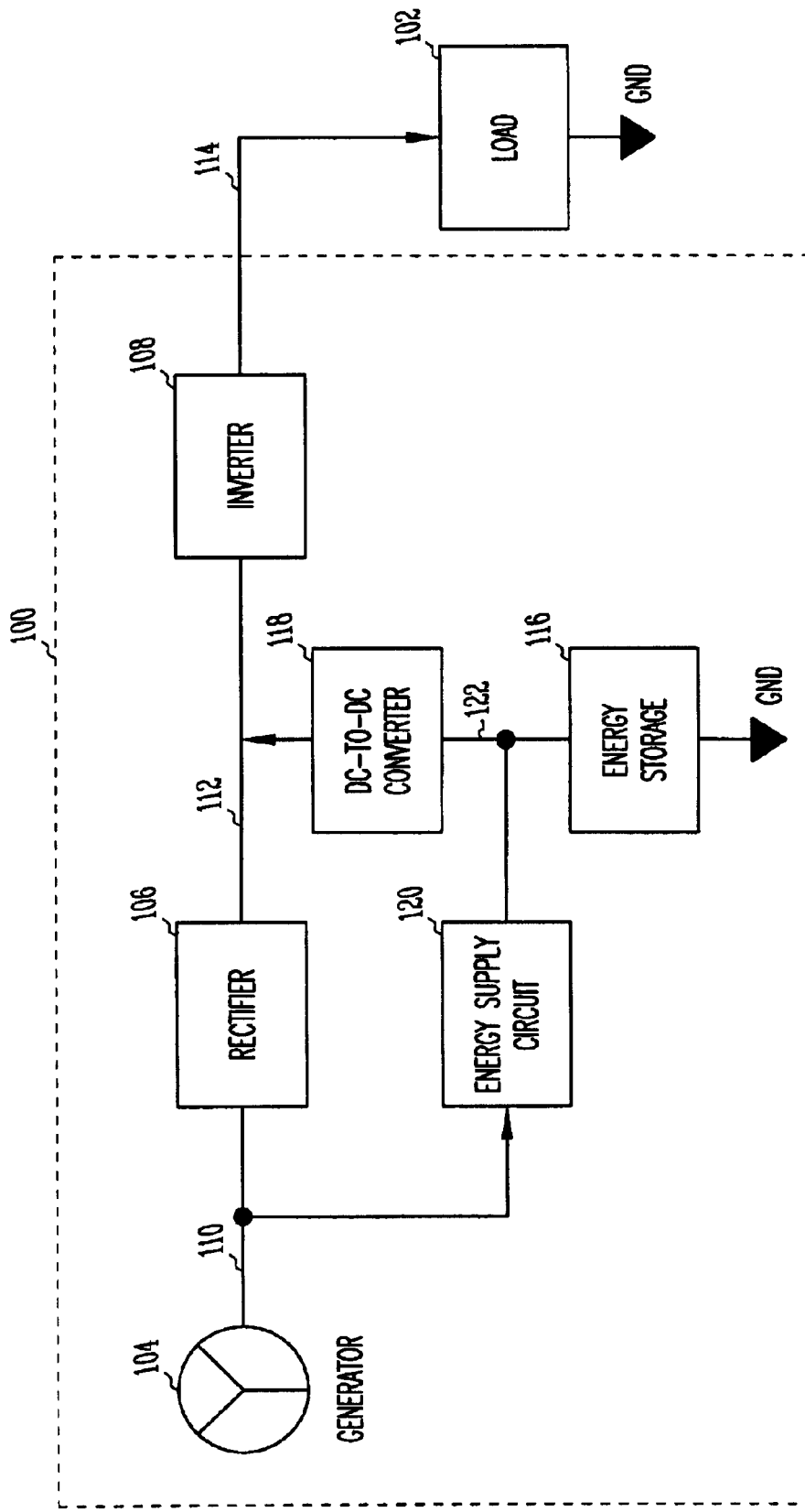
FIG. 1 is a schematic/block diagram illustrating generally one example of a local power generation system that includes, among other things, an enhanced immunity to drawn power variations by load.

FIG. 1 is a schematic/block diagram illustrating generally one example of a local power generation system 100 that includes, among other things, an enhanced immunity to drawn power variations by load 102. In this example, system 100 includes a generator 104, rectifier 106, and an inverter 108. In one example, generator 104 is a variable-speed generator powered by, for example, a gasoline engine, a diesel engine, a reciprocating internal combustion engine, a gas turbine, a steam turbine, a Sterling engine, or a rotary engine. Generator 104 provides a multi-phase AC generator output coupled, at node/bus 110, to an input of rectifier 106. Rectifier 106 includes a unidirectional current flow device, such as a diode associated with each individual phase leg of node/bus 110. Rectifier 106 converts the AC input signal at node/bus 110 to a rectified approximately DC output signal, which is provided at a rectifier output coupled at node/bus 112 to an input of inverter 108. Inverter 108 converts the DC signal at its input, at node/bus 112, to a one-phase, two-phase, or three-phase AC signal provided at an inverter output coupled at node/bus 114 to load 102. In one example, inverter 108 includes a pulsewidth-modulated (PWM) switched-mode bridge circuit.

System 100 also includes an energy storage device 116, a converter 118, and an energy supply circuit 120. Energy supply circuit 120 includes an output, at node/bus 122, that provides energy to energy storage device 116. In this example, energy supply circuit 120 includes a diode rectifier having an input, at node/bus 110, to receive AC power from the output of generator 104. Energy storage device 116, in this example, includes a capacitor to store electrical energy. In one example, the capacitor is an electrochemical capacitor cell (also referred to as an ultracapacitor or supercapacitor). The electrochemical capacitor includes a dielectric layer that forms naturally in its electrolyte when an voltage is applied. Because the dielectric may form in a very thin double layer on the surface of the capacitor's electrodes, such an example of an electrochemical capacitor is sometimes referred to as a double layer capacitor (DLC). Although referred to in the art and herein as an electrochemical capacitor, charge storage occurs electrostatically. Other examples of energy storage device 116 include a rechargeable battery or any other suitable device for storing energy in any form and providing an electrical energy output at node/bus 122.

In the example of FIG. 1, because the operating voltage needed at the inverter input at node/bus 112 may differ from that obtained at node/bus 122 from energy storage device 116, a switched-mode or other converter between these nodes/buses performs a DC-to-DC voltage conversion, if needed. In one example, in which inverter 108 delivers a 60 Hz, 139 V rms (line-to-neutral)/240 V rms (line-to-line) magnitude three-phase AC signal at node/bus 114 to load 102, an inverter DC input voltage of about 400 V is required at node 112. In this example, energy storage device 112 is an electrochemical capacitor storing a DC voltage at node/bus 122 that is approximately between 105 V and 210 V. Therefore, in this example, a step-up or boost DC-to-DC converter 118 performs the upward voltage translation to generate the about 400 V needed at node/bus 112 to operate inverter 108.

In operation, while the power drawn by load 102 remains stable, generator 104 provides such power through rectifier 106 and inverter 108. During at least a portion of such a time period, energy supply circuit 120 stores energy in energy storage device 116. However, when the power drawn by load 102 increases faster than generator 104 can accelerate to accommodate the increase (referred to as "surge power"), converter 118 transfers at least a portion of the energy in energy storage device 116 to the inverter input at node/bus 112 to maintain a sufficient DC voltage there. Because the response of converter 118 is faster than the acceleration response of generator 104, system 100 provides improved load pickup when a motor in load 102 is turned on, when other loads are switched into parallel with load 102, or when the power drawn by load 102 is otherwise abruptly increased. Energy storage device 116 is sized to provide enough energy storage capacity to maintain the DC voltage at node/bus 112 until the speed of generator 104 increases sufficiently to maintain the DC voltage at node/bus 112.

Figure 2:
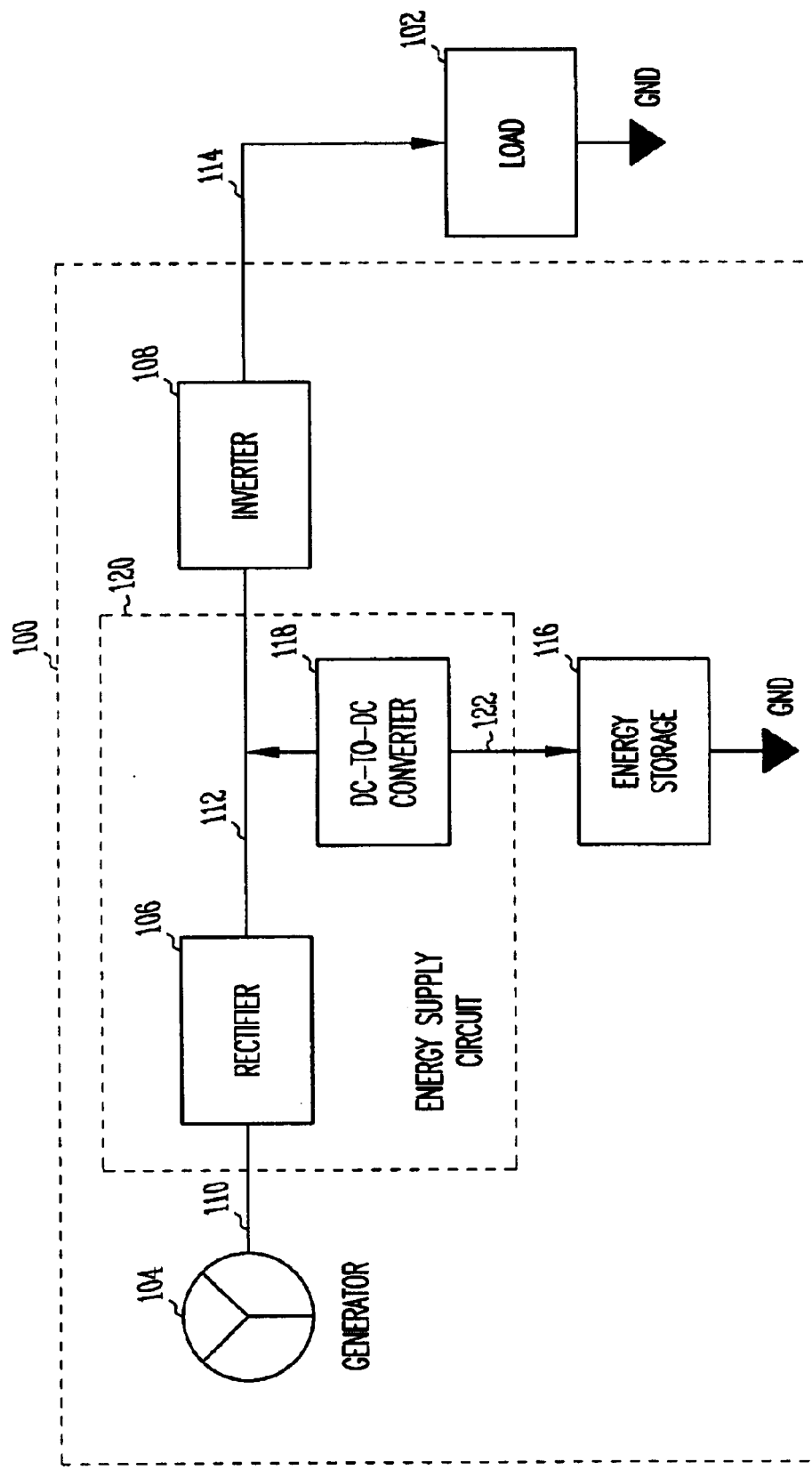
FIG. 2 is a schematic/block diagram illustrating generally an alternate example of the system in which a rectifier and converter double as an energy supply circuit.

FIG. 2 is a schematic/block diagram illustrating generally an alternate example of system 100 in which rectifier 106 and converter 118 double as energy supply circuit 120. In this example, converter 118 operates bidirectionally. Generator 104 runs at a speed sufficient to maintain the DC voltage at node/bus 112 while delivering steady-state power to load 102, and while converter 118 stores energy in energy storage device 116 by downwardly translating the voltage level at node/bus 112. Then, when the power drawn by load 102 increases more rapidly than generator 104 and rectifier 106 can sustain the DC voltage at node/bus 112, converter 118 transfers energy from energy storage device 116 to node/bus 112 by performing a boost voltage translation. During this time, generator 104 accelerates to the speed needed to accommodate the increased power drawn by load 102.

Figure 3:
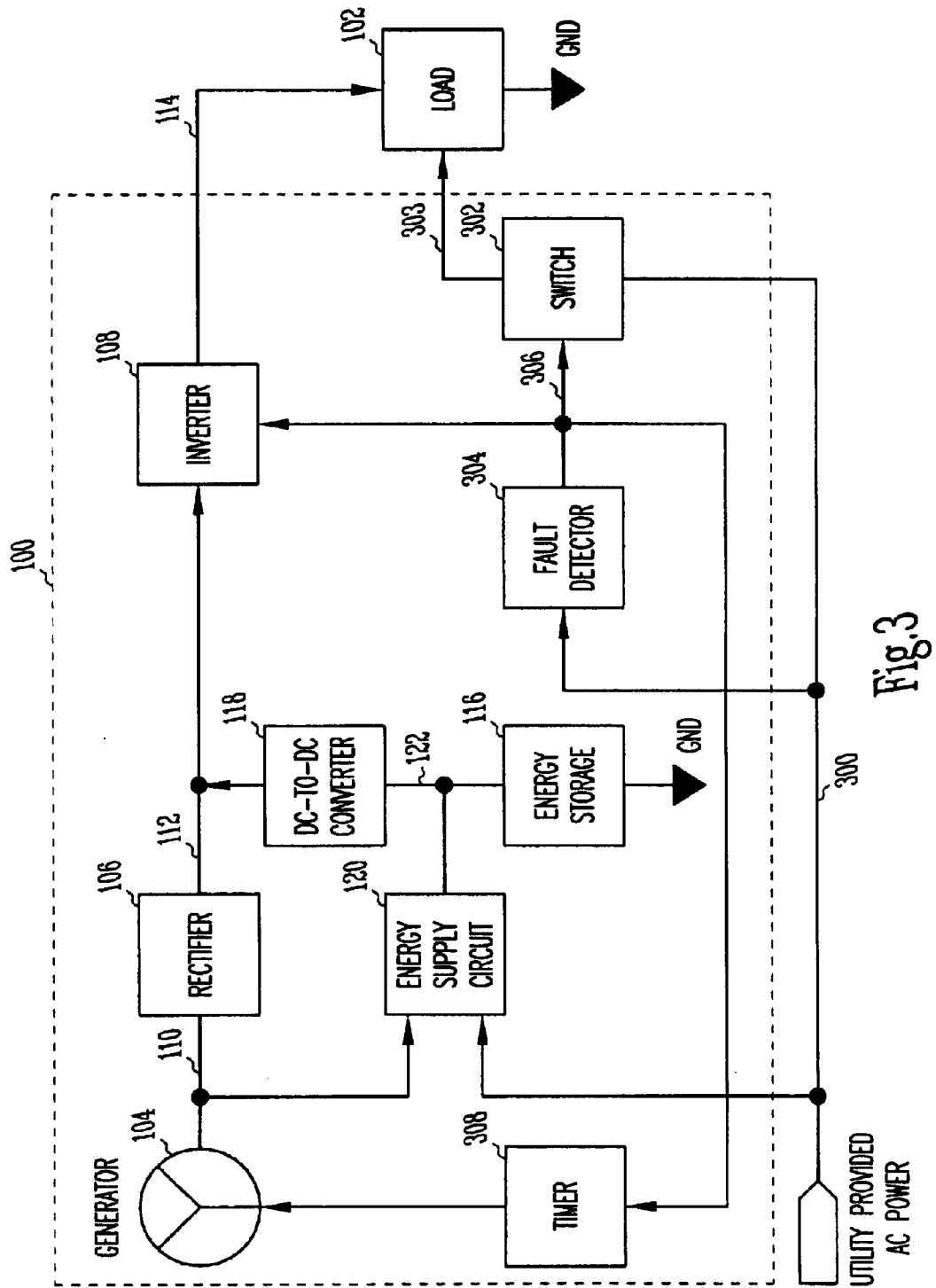
FIG. 3 is a schematic/block diagram illustrating generally an alternate example of the system used with a utility-provided AC power source in an uninterruptible power supply (UPS) application.

FIG. 3 is a schematic/block diagram illustrating generally an alternate example of system 100 used with a utility-provided AC power source at node/bus 300, for example, in an uninterruptible power supply (UPS) application. This example includes a solid-state or other switch 302 for coupling the utility-provided AC power signal at node/bus 300 to load 102 (via node/bus 303) when no fault is present on the utility-provided AC power signal. One example of switch 302 is a pair of back-to-back thyristors (also referred to as silicon-controlled rectifiers (SCRs)). The anode of the first thyristor is coupled to the cathode of the second thyristor of the pair; the anode of the second thyristor is coupled to the cathode of the first thyristor. This back-to-back configuration provides bidirectional conduction. The thyristors include a control gate turned on by a trigger signal. The thyristors turn off upon a zero-cross of the conducted signal. System 100 also includes a fault detector 304. Fault detector 304 includes an input coupled at node/bus 300 to the utility-provided AC power signal. Fault detector 304 detects a fault condition on the utility-provided AC power signal. In one example, the fault condition includes an undervoltage (including a complete absence of line voltage) on one or more phase legs of node/bus 300 lasting for predetermined period of time. In one example, the predetermined period of time triggering a fault condition is less than or equal to the time associated with ½ cycle of the utility-provided AC power signal. For example, for a 60 Hz two-phase utility-provided AC power signal having a period of about 16.6 milliseconds, the fault condition trigger period may be approximately between 0 milliseconds and 8.3 milliseconds. Other examples of fault conditions include an excessive voltage, or an excessive or insufficient frequency for the same or a different fault condition trigger period. Fault detector 304 also includes an output, indicative of the presence or absence of the fault condition, which is provided at node/bus 306 to a control terminal of switch 302 to turn-off switch 302 when the fault condition is present. Switch 302 turns off either asynchronously or, alternatively, synchronized to a zero-crossing of the utility-provided AC power signal at node/bus 300. Turning off the utility-provided AC power signal isolates load 102 from the utility-provided AC power signal at node/bus 300 when the fault condition is present. Fault detector 304 also delivers, at node/bus 306, its output signal indicative of the fault condition to a control input of inverter 108. This turns on inverter 108 when the fault condition is present on the utility-provided AC power signal, such that inverter 108 then operates to provide backup AC power at node/bus 114 to load 102. Inverter 108 turns on either asynchronously or, alternatively, synchronized to a zero-crossing of the utility-provided AC power signal at node/bus 300.

In the example of FIG. 3, the output at node/bus 306 of fault detector 304, which is indicative of a fault condition on the utility-provided AC power signal at node/bus 300, is also coupled to an input of a timer/delay circuit 308. An output of timer 308 is coupled to generator 104 to start generator 104 after the fault condition is continuously present for a predetermined period of time (for example, 3 seconds). In this example, energy supply circuit 120 includes two diode-coupled inputs for receiving AC electrical power. The first input is diode-coupled to the generator output at node/bus 110, for receiving AC electrical power when the fault condition is present and generator 110 is running and providing sufficient AC electrical power to forward-bias the corresponding coupling diode(s) which, in one example, includes an anode coupled to the generator output at node/bus 110. The second input of energy supply circuit 120 is diode-coupled to the utility-provided AC power source at node/bus 300 for receiving AC electrical power when the fault condition is not present and the utility-provided AC power source is providing sufficient AC electrical power to forward-bias the corresponding coupling diode(s) which, in one example, includes an anode coupled to the utility-provided AC power source at node/bus 300.

Thus, in one example of operation, system 100 transfers utility-provided AC power to load 102 through switch 302 when no fault condition exists. During this time, utility-provided AC power is also used to store energy in energy storage device 116. When a fault condition exists for a predetermined period of time (e.g., less than or equal to ½ cycle of the utility-provided AC power signal), switch 302 isolates load 102 from the utility-provided AC power source, and inverter 108 then provides power to load 102. If the fault condition persists for a predetermined period of time (e.g., between about 0.5 second and about 5 seconds, such as about a 3 second delay), generator 104 is started. In one example, generator 104 becomes capable of maintaining the needed DC voltage at node/bus 112 and supporting energy supply circuit 120 within about seven seconds after being started. Energy storage device 116 is sized to provide sufficient energy storage capacity to maintain the DC voltage at node/bus 112 during the delay period before generator 104 starts and during the subsequent delay period while the generator accelerates to a speed capable of maintaining the needed DC voltage at node/bus 112 and supporting energy supply circuit 120 (e.g., a total delay period of between about 0.5 second and about 60 seconds, such as about 10 seconds). In one such illustrative example, in which load 102 draws 25 kVA for the 10 second example period referred to above, the energy storage capacity of energy storage device 116 is about 313 kJ (assuming an 80% system efficiency between energy stored in energy storage device 116 and energy provided at node 114 to load 102). After the fault condition on the utility-provided AC power signal at node/bus 300 ceases, inverter 108 and generator 104 turn off, and switch 302 turns on to synchronously or asynchronously recouple the utility-provided AC power at node/bus 300 to load 102. In one example, however, generator 104 and inverter 108 momentarily continue to operate synchronously in parallel with the utility-provided AC power source to ensure that power is delivered to first load 102 without interruption, then turn off. In one example, the recoupling is delayed until energy storage device 116 has been recharged. In a further example, the recoupling is also delayed for a predetermined delay period from the ceasing of the fault condition and/or the recharging of energy storage device 116.

Figure 4:
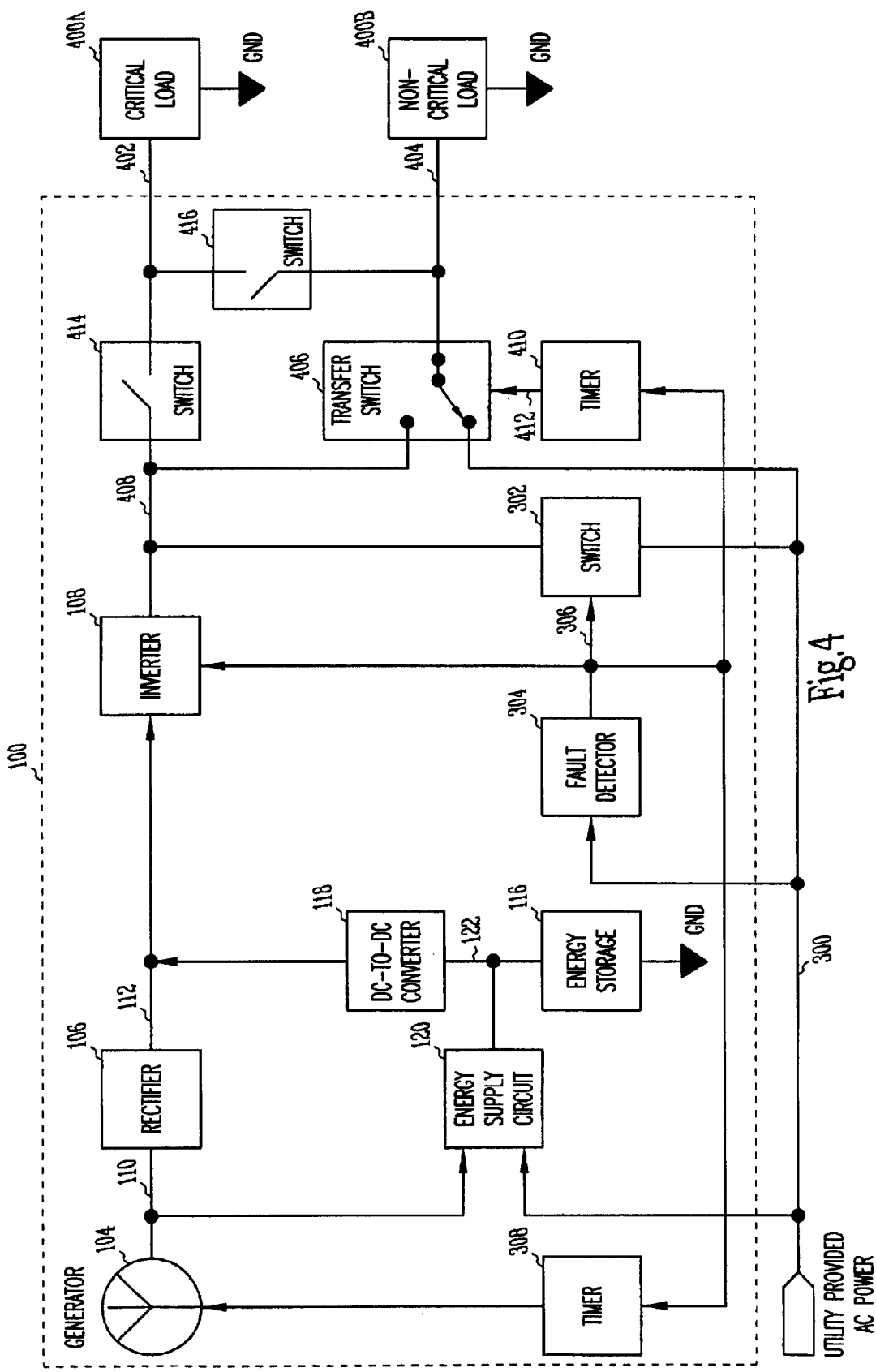
FIG. 4 is a schematic/block diagram illustrating generally an alternate example of the system in an uninterruptible power supply (UPS) application that includes a critical load, for which uninterrupted power is desired, and a noncritical load, which accepts a short power interruption.

FIG. 4 is a schematic/block diagram illustrating generally an alternate example of system 100 in an uninterruptible power supply (UPS) application that includes a critical load 400A (e.g., computer equipment, etc.), for which uninterrupted power is desired, and a noncritical load 400B (e.g., lights, etc.), which accepts a short power interruption. In this example, system 100 is coupled to critical load 400A at node 402, and to noncritical load 400B at node 404. A transfer switch 406 couples noncritical load 404 either to the utility-provided AC power signal at node/bus 300 or, alternatively, to receive backup AC power from the inverter output at node/bus 408. In this example, system 100 includes a timer/delay circuit 410 having an input coupled, at node/bus 306, to the output of fault detector 304, which indicates whether the utility-provided AC power signal at node/bus 300 exhibits the fault condition. An output of timer/delay circuit 410 is coupled, at node/bus 412, to a control input of transfer switch 406. The backup AC power provided by the output of inverter 108, at node/bus 408, is coupled by switch 414, via node/bus 402, to critical load 400A.

In operation, when no fault condition exists at the utility-provided AC power signal, both critical load 400A and noncritical load 400B are coupled to receive their AC power from the utility-provided AC power source at node/bus 300; switches 302 and 414 are both on, and transfer switch 406 conducts between node/bus 300 and node/bus 404. When the fault condition appears, critical load 400A substantially immediately switches over to receive AC power from the output of inverter 108; switch 302 turns off (e.g., within ½ cycle of the fault condition appearing). However, noncritical load 400B remains coupled to the utility provided AC power signal at node/bus 300. Therefore, noncritical load 400B is subjected to the fault condition (e.g., undervoltage, complete failure, etc.) As discussed above, if the fault condition continuously persists for a delay period (e.g., about three seconds), timer 308 turns on generator 104. After a short delay period sufficient for generator 104 to accelerate to enough speed to maintain the DC voltage at node/bus 112, so that inverter 108 can provide AC power to critical load 400A, noncritical load 400B, and energy supply circuit 120 (e.g., about seven additional seconds), then transfer switch 406 couples noncritical load 400 to receive AC power from the inverter output at node/bus 408. Energy supply circuit 120, which in one example is diode-coupled to node/bus 110, as discussed above, then draws input AC power from the generator output at node/bus 110. After the utility-provided AC power source's fault condition ceases, critical load 400A and noncritical load 400B are synchronously or asynchronously recoupled to node/bus 300 to again receive the utility-provided AC power; switch 302 turns on, and switch 406 recouples node/bus 404 to node/bus 300. In one example, the recoupling is delayed until energy storage device 116 has been recharged. In a further example, the recoupling is also delayed for a predetermined delay period from the ceasing of the fault condition and/or the recharging of energy storage device 116. Generator 104 and inverter 108 then turn off. In one example, however, generator 104 and inverter 108 momentarily continue to operate synchronously in parallel with the utility-provided AC power source to ensure that power is delivered to first load 102 without interruption, then turn off. Energy supply circuit 120, which in one example is diode-coupled to each of node/bus 110 and node/bus 300, then resumes drawing its input AC power from the utility-provided AC power signal at node/bus 300.

In a further example, system 100 optionally includes an additional switch 416 interposed between node/bus 402 and node/bus 404. Turning on switch 416 couples critical load 400A and noncritical load 400B in parallel. In one example, this allows uninterrupted power delivery to noncritical load 400B as well as critical load 400A. However, power to noncritical load 400B is typically delivered through transfer switch 406. Switch 416 also provides a redundant power supplying path to noncritical load 400B, such as in the event that switch 406 fails in an open position. This further enhances the reliability of power delivery. In another example, by turning on switch 416 and turning off switch 414, both loads can be coupled to the utility-provided AC power source at node/bus 300, so that maintenance can be performed on the other components of system 100.

Figure 5:
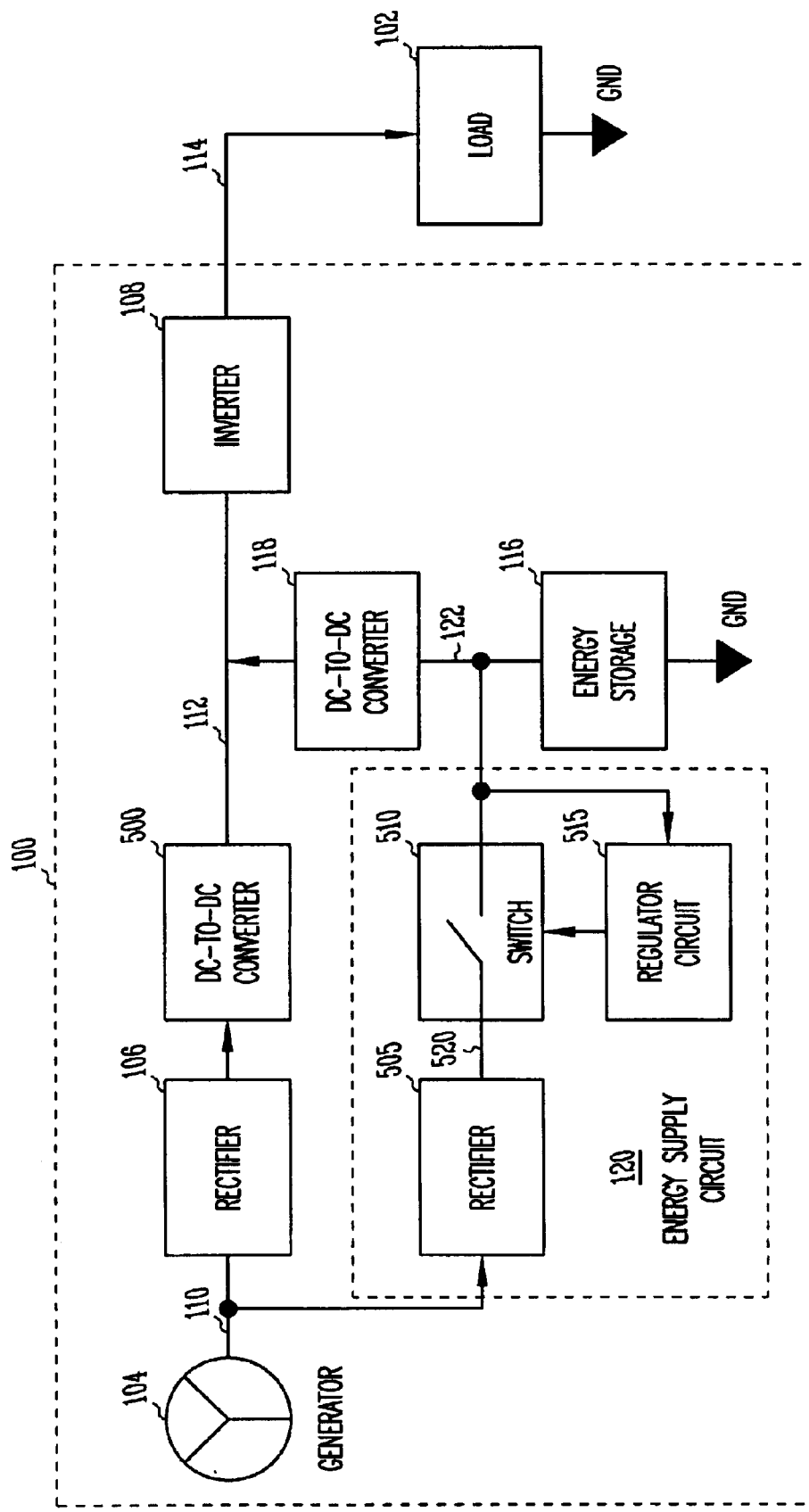
FIG. 5 is a schematic/block diagram illustrating generally an alternative example of the system in FIG. 1 (or the other Figures), in which a DC-to-DC converter is interposed between the output of the rectifier and the input of the inverter.

In other examples, system 100 includes a DC-to-DC converter 500 interposed between the output of rectifier 106 and node 112, as illustrated generally by the schematic/block diagram of FIG. 5 (which modifies the example of FIG. 1). Converter 500 is used when generator 104 and rectifier 106 do not produce the desired value of DC voltage at node/bus 112 to operate inverter 108. In one example, converter 500 is a boost converter used to increase the substantially DC voltage provided by the output of rectifier 106 to the level desired at node 112 to operate inverter 108. However, another implementation may require a downward voltage conversion. Converter 500 could similarly be used in the other illustrated examples of this document. In an alternative embodiment, converter 500 provides an upward or downward voltage translation, but need not be a DC-to-DC converter. In one example, a AC-to-AC voltage boosting converter 500 (e.g., a transformer) is interposed between generator 104 and rectifier 106 in FIGS. 1–4. In another example, a transformer-based or other AC-to-DC voltage boosting and rectifying converter 500 is substituted for rectifier 106 in FIGS. 1–4.

FIG. 5 also illustrates an alternative example of energy supply circuit 120, which includes a rectifier 505, a switch 510, and a regulator circuit 515 that includes a voltage-sensing comparator used to control switch 510. In this example, an input of rectifier 505 is coupled at node 110 to an AC power output of generator 104. Rectifier 520 is coupled to energy storage device 116 through switch 510. In this example, an output of rectifier 505 provides a substantially DC voltage coupled, at node/bus 520, to a first conduction terminal of switch 520. A second conduction terminal of switch 520 is coupled at node/bus 122 to energy storage device 116. A voltage-sensing input of regulator circuit 515 is also coupled at node/bus 122 to energy storage device 116. An output of regulator circuit 515 is coupled to a control terminal of switch 510.

In operation, regulator circuit 515 regulates the stored voltage at node/bus 122 to a desired value. Regulator circuit 515 senses the voltage at node/bus 122, and compares it to the desired value. If the voltage at node/bus 122 is less than the desired value, regulator circuit 515 issues a control signal to the control terminal of switch 510 to close switch 510; otherwise switch 510 is open. When switch 510 is closed, energy supply circuit 120 supplies energy to energy storage device 116, thereby increasing the voltage at node/bus 122. This example of energy supply circuit 120 need not be diode-coupled to generator 104, as discussed above. However, it may include diode(s) in rectifier 505. This example of energy supply circuit 120 could similarly be used in the other illustrated examples of this document.

Some of the Figures in this document, discuss their load pickup and UPS applications in terms of using a generator 104 such as a variable-speed engine generator. However, system 100 is not so limited. Both the load pickup and UPS techniques discussed above similarly apply to a system 100 in which generator 104 is a substantially constant speed engine generator. In one such example, the constant speed generator must be sized to run at a speed that provides sufficient output power to meet the maximum power draw requirements of load 102. If load 102 draws surge power beyond that being provided by a constant speed generator, system 100 can assist in momentarily providing such surge power. This, in turn, assists in maintaining a constant engine generator speed while accommodating the increased power drawn by the load. Similarly, in the UPS applications discussed herein, generator 104 may be a variable-speed generator or a substantially constant speed generator.

Figure 6:
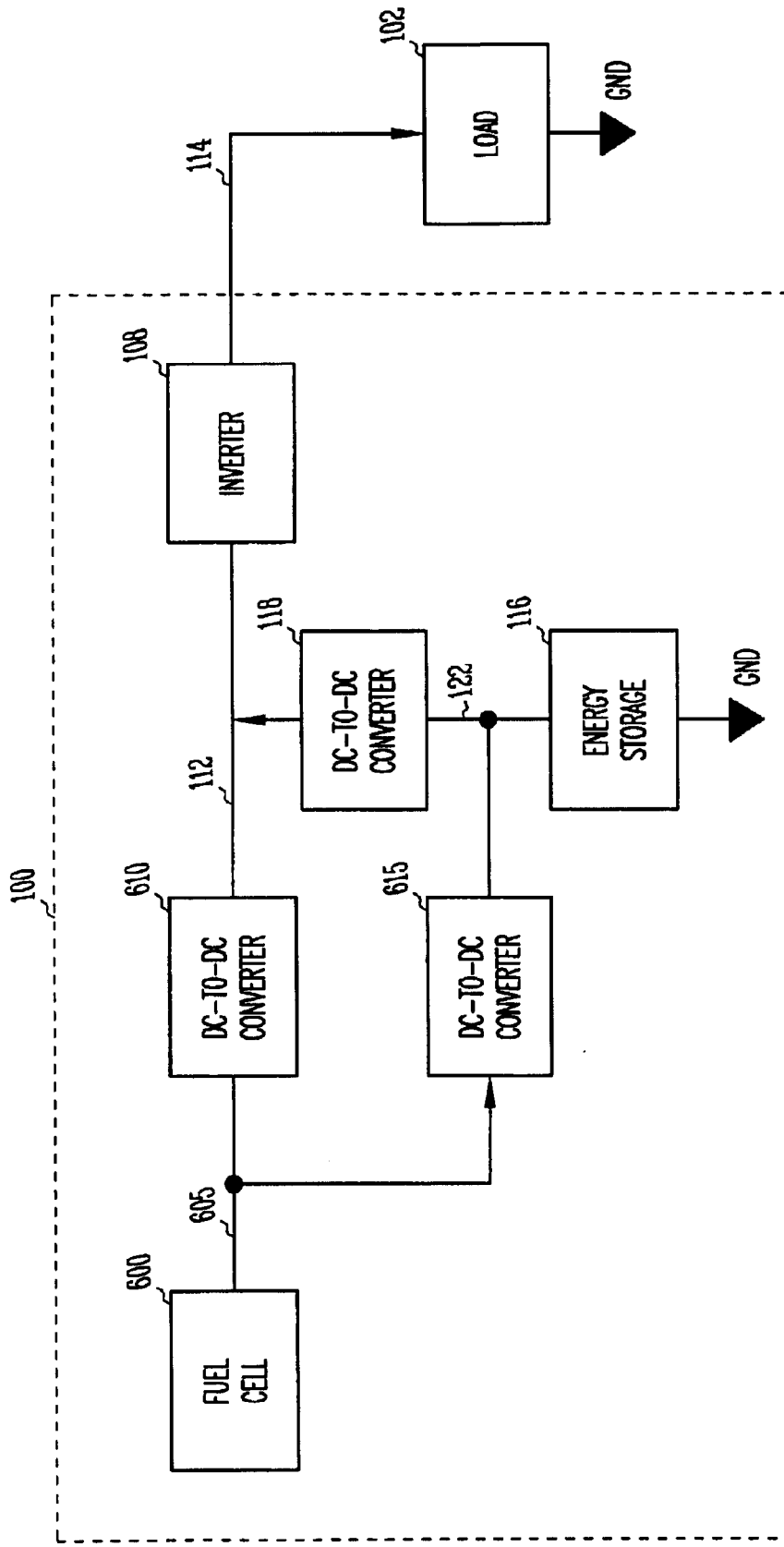
FIG. 6 is a schematic/block diagram illustrating generally an alternative example of the system in which the generator includes a fuel cell alternative to an engine-generator.

FIG. 6 is a schematic/block diagram illustrating generally an alternative example of system 100, in which generator 104 is implemented as a fuel cell 600, rather than as the variable-speed engine generator discussed above. Fuel cell 600 outputs a substantially DC voltage, at node/bus 605, which is received at an input of DC-to-DC converter 610. Converter 610 includes an output that provides the desired DC voltage at node/bus 112. In one example, converter 610 is a boost converter that provides a greater output voltage, at node/bus 112, than its input voltage at node/bus 605. Another DC-to-DC converter 615 routes energy from fuel cell 600 to energy storage device 116 for storage therein. Converter 615 converts the substantially DC voltage at its input, at node/bus 605, to the appropriate regulated substantially DC voltage at its output, at node/bus 122.

Operation of system 100 as illustrated in FIG. 6 is analogous to that described with respect to FIG. 1, in which the speed of a variable-speed engine generator was adjusted to increase or decrease its energy output to accommodate changes in power drawn by load 102. Similarly, in FIG. 6, the reaction rate of fuel cell 600 can be increased or decreased to adjust its energy input. Acceleration of the reaction rate of fuel cell 600, however, is typically slower than the response time of converter 118. Therefore, if the power drawn by load 102 increases suddenly, converter 118 extracts energy from energy storage device 116 to maintain the needed voltage at node/bus 112 while the reaction of fuel cell 600 accelerates to accommodate the new power draw of load 102. Similarly, where the power drawn by load 102 decreases faster than the reaction of fuel cell 600 can be slowed, converter 118 may operate in the opposite direction, to move excess energy at node/bus 112 to node/bus 122 for storage in energy storage device 116. Fuel cell 605 can similarly substitute for a variable-speed engine generator in any of the other illustrated examples in this document.

It is to be understood that the above description is intended to be illustrative, and not restrictive. For example, the above-discussed embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects.

What is claimed is:

1. A system providing AC electrical power to a first load device, the system including:
   a generator, including a generator output;
   a fault condition detector, including an input that is coupled to a utility to detect a fault condition at the utility, and including an output that is coupled to the generator to initiate a generator startup after the fault condition has been detected;
   an inverter circuit, including an inverter input and an inverter output, the inverter input coupled to the generator output, the inverter output adapted to be coupled to the first load device;
   an energy storage device that provides power to the first load device during the generator startup;
   a first DC-to-DC converter circuit, including a first converter input and a first converter output, the first converter input coupled to the energy storage device, and the first converter output coupled to the inverter input; and
   an electrical energy supply circuit, including an energy supply circuit input and an energy supply circuit output, the energy supply circuit output coupled to the energy storage device, the energy supply circuit input coupled to a power source that is selected from at least one of a utility-provided AC power source outside of the system and the generator output.

2. The system of claim 1, in which the generator includes at least one of a fuel cell and an engine generator.

3. The system of claim 2, in which the engine generator is at least one of a variable speed engine generator and a constant speed engine generator.

4. The system of claim 1, further including a first rectifier coupled in series between the generator output and the inverter input, the first rectifier having a first rectifier input and a first rectifier output, the first rectifier input coupled to the generator output.

5. The system of claim 4, further including a second DC-to-DC converter coupled in series between the first rectifier and the first inverter, the second DC-to-DC converter having a second converter input and a second converter output, the second converter input coupled to the first rectifier output, and the second converter output coupled to the inverter input.

6. The system of claim 4, further including an AC-to-AC voltage converter coupled in series between the generator output and the first rectifier input.

7. The system of claim 1, further including a second DC-to-DC converter coupled in series between the generator output and the inverter input, the second DC-to-DC converter including a second converter input and a second converter output, the second converter input coupled to the generator output and the second converter output coupled to the inverter input.

8. The system of claim 1, in which the energy storage device includes at least one of a capacitor and a rechargeable battery.

9. The system of claim 8, in which the capacitor includes an electrochemical capacitor.

10. The system of claim 1, in which the first DC-to-DC converter includes a step-up DC-to-DC converter converting a lower voltage received at the first converter input from the energy storage device to a higher voltage provided by the first converter output to the inverter input.

11. The system of claim 1, in which the energy supply circuit includes a rectifier that includes:
    a first diode, having an anode coupled to the generator output; and
    a second diode, having an anode coupled to the utility-provided AC power source.

12. The system of claim 1, in which the energy supply circuit includes a second DC-to-DC converter, having a second converter input and a second converter output, the second converter input coupled to the generator output, and the second converter output coupled to the energy storage device.

13. The system of claim 1, in which the energy supply circuit includes:
    a rectifier, having a rectifier input coupled to at least one of the generator output and the utility-provided AC power source, the rectifier having a rectifier output;
    a switch, coupling the rectifier output to the energy storage device, the switch including a control terminal; and
    a regulator circuit, coupled to the energy storage device to sense a voltage, and coupled to the control circuit of the switch to regulate conduction of the switch to maintain a predetermined voltage at the energy storage device.

14. The system of claim 1, in which the energy storage device includes an energy storage capacity that is limited to an approximate energy needed to approximately maintain a steady voltage at the inverter input when a motor within the first load device is started and draws surge power from the inverter output.

15. The system of claim 1, in which the energy storage device includes an energy storage capacity that is limited to an approximate energy needed to approximately maintain a steady voltage at the inverter input during a first time period in which the engine generator is started and until the generator output reaches a steady-state output voltage sufficient to maintain the voltage at the inverter input.

16. The system of claim 15, in which the first time period also includes a waiting period before the engine generator is started.

17. The system of claim 16, in which the waiting period is between about 0.5 second and about 5 seconds.

18. The system of claim 17, in which the waiting period is about 3 seconds.

19. The system of claim 1, in which the energy storage device includes an energy storage capacity that is limited to an approximate energy needed to approximately maintain a steady voltage at the inverter input for an interim time that is between about 0.5 seconds and about 60 seconds.

20. The system of claim 19, in which the interim time is about 10 seconds.

21. The system of claim 1, further including:
a first switch, coupled between the utility-provided AC power source and the inverter output, the first switch including a first switch-control input; and
the fault condition detector circuit is coupled to the utility-provided AC power source to detect a fault condition of the utility-provided AC power source, the detector circuit including a detector output coupled to the first switch-control input to operate the first switch to isolate the inverter output and the first load device from the utility-provided AC power source when the fault condition is detected.

22. The system of claim 21, in which the fault condition includes an at least ½ cycle undervoltage of the utility-provided AC power source.

23. The system of claim 21, in which the inverter circuit includes a synchronization circuit to synchronize a signal at the inverter output to the utility-provided AC power source.

24. The system of claim 23, in which the synchronization circuit operates to synchronize the signal at the inverter output to the utility-provided AC power source at least after the first switch isolates the first load from the utility-provided AC power source.

25. The system of claim 21, in which the fault detector output provides a control signal to the first switch-control input to operate the first switch to recouple the first load to the utility-provided AC power source after the fault detector detects the ceasing of the fault condition at the AC power source.

26. The system of claim 25, in which the inverter momentarily operates synchronously in parallel with the recoupled utility-provided AC power source to avoid a momentary break in power to the first load during the recoupling.

27. The system of claim 21, in which the fault detector output provides a control signal to the first switch-control input to operate the first switch to recouple the first load to the utility-provided AC power source after the fault detector detects the ceasing of the fault condition at the AC power source, and after the energy storage device has been recharged for a predetermined delay period.

28. The system of claim 25, in which the inverter circuit includes a synchronization circuit to synchronize a signal at the inverter output to the utility provided AC power source before the first load is recoupled to the utility-provided AC power source.

29. The system of claim 1, further providing power to a second load device, and further including a switch, having first and second states, the switch conductively coupling the second load to the utility-provided AC power source when the switch is in the first state, the switch conductively coupling the second load to the inverter output when the switch is in the second state.

30. The system of claim 29, in which the generator is coupled to the switch to provide a control signal transitioning the switch from the first state to the second state after the generator has been turned on and is capable of maintaining the inverter input at a predetermined sufficient voltage.

31. The system of claim 29, further including a timer coupled to the generator and the switch, the timer including a timer output coupled to the switch to provide a control signal to transition the switch from the first state to the second state at a predetermined time after the generator has been turned on.

32. The system of claim 29, further including:
a second switch, coupling the inverter output to the first load; and
a third switch, coupling the second load in parallel with the first load.

33. A method of providing an electrical AC output signal to a first load, the method including:
generating a first approximately DC voltage from a fuel;
modulating the first DC voltage into the AC output signal;
providing the AC output signal to the first load; and
transferring energy from an energy storage device onto the first DC voltage to maintain the first DC voltage at a first predetermined DC voltage value while the first load draws a surge power AC output signal, and in which the transferring includes converting a second DC voltage value provided by the energy storage device to the first predetermined DC voltage value, and in which the transferring includes using the energy storage device having an energy storage capacity that is limited to approximately the energy storage needed to maintain the first DC voltage long enough for a generator to accelerate, to accommodate the surge power AC output signal.

34. The method of claim 33, further including transferring energy to the energy storage device from at least one of:
an generator-provided power source; and
a utility-provided AC power source.

35. A method of providing AC electrical power to a first load, the method including:
decoupling the first load from a utility-provided AC power source that, during normal operation, is provided to the first load without AC-to-DC-to AC conversion, upon detecting a fault condition at the utility-provided AC power source;
modulating a DC voltage to provide backup AC power;
coupling the backup AC power to the first load when the first load is decoupled from the utility-provided AC power source;
turning on an generator to provide energy to the DC voltage; and
transferring energy from an energy storage device to the DC voltage during a time from the turning on of the generator to a time at which the generator is supplying sufficient power to maintain the DC voltage at a first predetermined voltage value, and in which the transferring energy from the energy storage device includes DC-to-DC converting a second voltage value provided by the energy storage device to the first predetermined voltage value of the DC voltage.

36. The method of claim 35, in which the decoupling the first load includes triggering the decoupling by detecting a zero-cross of the utility-provided AC power source.

37. The method of claim 35, in which the detecting the fault condition includes detecting an at least ½ cycle undervoltage of the utility-provided AC power source.

38. The method of claim 35, in which the transferring energy from the energy storage device includes using the energy storage device having an energy storage capacity that is limited to approximately the energy storage needed to maintain the first DC voltage for a time from the turning on of the generator to the time at which the generator is supplying sufficient power to maintain the DC voltage at a first predetermined voltage value.

39. The method of claim 35, further including transferring energy to the energy storage device from at least one of:
   the generated power from the generator; and
   the utility-provided AC power source.

40. The method of claim 35, further including transferring a second load from the utility provided-AC power source to the backup AC power from the modulated DC voltage after a time at which the generator is supplying sufficient power to maintain the DC voltage at a first predetermined voltage value.

41. The method of claim 35, in which the modulating the DC voltage to provide backup AC power to the first load includes synchronizing the backup AC power to the utility-provided AC power source at least upon the decoupling of the first load from the utility-provided AC power source.

42. The method of claim 35, further including:
   detecting a ceasing of the fault condition at the utility-provided AC power source; and
   recoupling the first load to the utility-provided AC power source.

43. The method of claim 42, in which the recoupling follows the detecting the ceasing of the fault condition and a recharging of the energy storage device.

44. The method of claim 42, further including synchronizing the backup AC power to the utility-provided AC power source before the recoupling the first load to the utility-provided AC power source.

45. The method of claim 42, further including decoupling the first load from the backup AC power.

46. The method of claim 44, in which the decoupling follows an operating the backup AC power synchronously in parallel with the utility-provided AC power source momentarily to avoid a break in power to the first load.

47. A system providing AC electrical power to a first load device, the system including:
   a generator, including a generator output;
   an inverter circuit, including an inverter input and an inverter output, the inverter input coupled to the generator output, the inverter output adapted to be coupled to the first load device; an energy storage device;
   a first DC-to-DC converter circuit, including a first converter input and a first converter output, the first converter input coupled to the energy storage device, and the first converter output coupled to the inverter input;
   an electrical energy supply circuit, including an energy supply circuit input and an energy supply circuit output, the energy supply circuit output coupled to the energy storage device, the energy supply circuit input coupled to a power source that is selected from at least one of a utility-provided AC power source outside of the system and the generator output;
   a first rectifier coupled in series between the generator output and the inverter input, the first rectifier having a first rectifier input and a first rectifier output, the first rectifier input coupled to the generator output; and
   a second DC-to-DC converter coupled in series between the first rectifier and the first inverter, the second DC-to-DC converter having a second converter input and a second converter output, the second converter input coupled to the first rectifier output, and the second converter output coupled to the inverter input.

48. The system of claim 47, further including an AC-to-AC voltage converter coupled in series between the generator output and the first rectifier input.

49. A system providing AC electrical power to a first load device, the system including:
   a generator, including a generator output;
   an inverter circuit, including an inverter input and an inverter output, the inverter input coupled to the generator output, the inverter output adapted to be coupled to the first load device;
   an energy storage device;
   a first DC-to-DC converter circuit, including a first converter input and a first converter output, the first converter input coupled to the energy storage device, and the first converter output coupled to the inverter input; and
   an electrical energy supply circuit, including an energy supply circuit input and an energy supply circuit output, the energy supply circuit output coupled to the energy storage device, the energy supply circuit input coupled to a power source that is selected from at least one of a utility-provided AC power source outside of the system and the generator output, wherein the energy supply circuit includes a rectifier that includes:
      a first diode, having an anode coupled to the generator output; and
      a second diode, having an anode coupled to the utility-provided AC power source.

50. A system providing AC electrical power to a first load device, the system including:
   a generator, including a generator output;
   an inverter circuit, including an inverter input and an inverter output, the inverter input coupled to the generator output, the inverter output adapted to be coupled to the first load device;
   an energy storage device;
   a first DC-to-DC converter circuit, including a first converter input and a first converter output, the first converter input coupled to the energy storage device, and the first converter output coupled to the inverter input; and
   an electrical energy supply circuit, including an energy supply circuit input and an energy supply circuit output, the energy supply circuit output coupled to the energy storage device, the energy supply circuit input coupled to a power source that is selected from at least one of a utility-provided AC power source outside of the system and the generator output, wherein the energy supply circuit includes:
      a rectifier, having a rectifier input coupled to at least one of the generator output and the utility-provided AC power source, the rectifier having a rectifier output;
      a switch, coupling the rectifier output to the energy storage device, the switch including a control terminal; and
      a regulator circuit, coupled to the energy storage device to sense a voltage, and coupled to the control circuit of the switch to regulate conduction of the switch to maintain a predetermined voltage at the energy storage device.

51. A system providing AC electrical power to a first load device and a second load device, the system including:
   a generator, including a generator output;
   an inverter circuit, including an inverter input and an inverter output, the inverter input coupled to the generator output, the inverter output adapted to be coupled to the first load device;

an energy storage device;

a first DC-to-DC converter circuit, including a first converter input and a first converter output, the first converter input coupled to the energy storage device, and the first converter output coupled to the inverter input; and an electrical energy supply circuit, including an energy supply circuit input and an energy supply circuit output, the energy supply circuit output coupled to the energy storage device, the energy supply circuit input coupled to a power source that is selected from at least one of a utility-provided AC power source outside of the system and the generator output;

a switch, having first and second states, the switch conductively coupling the second load to the utility-provided AC power source when the switch is in the first state, the switch conductively coupling the second load to the inverter output when the switch is in the second state; and a timer coupled to the generator and the switch, the timer including a timer output coupled to the switch to provide a control signal to transition the switch from the first state to the second state at a predetermined time after the generator has been turned on.

52. A method of providing AC electrical power to a first load, the method including:

decoupling the first load from a utility-provided AC power upon detecting a fault condition at the utility-provided AC power source;

modulating a DC voltage to provide backup AC power;

coupling the backup AC power to the first load when the first load is decoupled from the utility-provided AC power source;

turning on an generator to provide energy to the DC voltage; and transferring energy from an energy storage device to the DC voltage during a time from the turning on of the generator to a time at which the generator is supplying sufficient power to maintain the DC voltage at a first predetermined voltage value, and in which the transferring energy from the energy storage device includes DC-to-DC converting a second voltage value provided by the energy storage device to the first predetermined voltage value of the DC voltage, and wherein the transferring energy from the energy storage device includes using the energy storage device having an energy storage capacity that is limited to approximately the energy storage needed to maintain the first DC voltage for a time from the turning on of the generator to the time at which the generator is supplying sufficient power to maintain the DC voltage at a first predetermined voltage value.

* * * * *